United States Patent
Magarelli et al.

(10) Patent No.: US 9,758,964 B2
(45) Date of Patent: Sep. 12, 2017

(54) STRUT HANGER

(71) Applicant: Facebook, Inc., Menlo Park, CA (US)

(72) Inventors: Marco Magarelli, Sunnyvale, CA (US); Scott C. Wiley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/057,279

(22) Filed: Mar. 1, 2016

(65) Prior Publication Data
US 2016/0178119 A1    Jun. 23, 2016

Related U.S. Application Data

(62) Division of application No. 14/335,497, filed on Jul. 18, 2014, now Pat. No. 9,322,169.

(51) Int. Cl.
| | |
|---|---|
| *E04B 9/20* | (2006.01) |
| *F16M 13/02* | (2006.01) |
| *F16L 3/24* | (2006.01) |
| *F16L 3/227* | (2006.01) |
| *H02G 3/32* | (2006.01) |
| *H02G 3/00* | (2006.01) |
| *F16B 2/24* | (2006.01) |
| *A47B 57/56* | (2006.01) |
| *H02G 3/30* | (2006.01) |

(52) U.S. Cl.
CPC ............ *E04B 9/205* (2013.01); *A47B 57/567* (2013.01); *F16B 2/241* (2013.01); *F16B 2/246* (2013.01); *F16L 3/227* (2013.01); *F16L 3/24* (2013.01); *F16M 13/022* (2013.01); *H02G 3/263* (2013.01); *H02G 3/30* (2013.01); *H02G 3/32* (2013.01)

(58) Field of Classification Search
CPC ........... F16L 3/227; H02G 3/32; H02G 3/263; E04B 9/205; F16B 2/246; F16B 2/241; A47B 57/567

USPC ........................................... 248/58, 68.1, 59
See application file for complete search history.

(56) References Cited

U.S. PATENT DOCUMENTS

| | | | |
|---|---|---|---|
| 744,149 A | 11/1903 | Cael et al. | |
| 1,606,289 A | 11/1926 | Bowers | |
| 3,233,297 A | 2/1966 | Havener et al. | |
| 3,562,873 A | 2/1971 | William et al. | |
| (Continued) | | | |

FOREIGN PATENT DOCUMENTS

| | | | |
|---|---|---|---|
| DE | 2361048 A1 | 6/1975 | |
| DE | 9415660 U1 | 1/1995 | |
| (Continued) | | | |

OTHER PUBLICATIONS

U.S. Appl. No. 14/335,497, of Magarelli, M. et al. filed Jul. 18, 2014.

*Primary Examiner* — Eret McNichols
(74) *Attorney, Agent, or Firm* — Perkins Coie LLP (57) ABSTRACT

Technology is provided for a strut hanger for connecting a strut to a hanger rod includes a hook portion configured to engage the exterior surface of the hanger rod, a lever portion, a fulcrum disposed between the hook portion and lever portion, and a strut tab extending from the lever portion and configured to engage a strut. Load placed on the strut tab causes the lever portion to act against the fulcrum to force the hook portion against the hanger rod, thereby supporting the strut from the hanger rods without fasteners attached to the hanging rods. The strut hanger can include a clip extending from the lever portion to engage the hanger rod and maintain a minimum load on the lever.

20 Claims, 10 Drawing Sheets

(56) References Cited

U.S. PATENT DOCUMENTS

| | | | |
|---|---|---|---|
| 3,708,941 A | 1/1973 | Cuckson | |
| 3,730,466 A | 5/1973 | Swanquist | |
| 3,752,902 A | 8/1973 | Wilson | |
| 3,938,767 A | 2/1976 | Norris | |
| 4,168,423 A | 9/1979 | Gilreath | |
| 4,232,847 A | 11/1980 | Cooper | |
| 4,545,166 A | 10/1985 | Kielmeyer | |
| 4,723,749 A | 2/1988 | Laughlin et al. | |
| 5,039,039 A | 8/1991 | Schaffer | |
| 5,063,274 A | 11/1991 | Johnson et al. | |
| 5,102,074 A | 4/1992 | Okada et al. | |
| 5,483,240 A | 1/1996 | Hsu et al. | |
| 6,619,627 B2 | 9/2003 | Salisbury et al. | |
| 7,780,130 B2 | 8/2010 | Riblet et al. | |
| 8,453,984 B2 | 6/2013 | Perry et al. | |
| 2009/0090820 A1 | 4/2009 | Tjerrild et al. | |
| 2009/0242710 A1 | 10/2009 | Quertelet et al. | |
| 2013/0248660 A1 | 9/2013 | Magno et al. | |
| 2015/0008295 A1 | 1/2015 | Bae et al. | |
| 2016/0018053 A1 | 1/2016 | Magarelli et al. | |

FOREIGN PATENT DOCUMENTS

| | | |
|---|---|---|
| DE | 29500353 U1 | 4/1995 |
| DE | 19927436 A1 | 12/1999 |
| DE | 102008006917 A1 | 7/2009 |
| DE | 102012010727 A1 | 5/2013 |
| EP | 0048387 B1 | 4/1985 |
| EP | 0433815 A1 | 6/1991 |
| EP | 0652337 A1 | 5/1995 |
| EP | 0870886 A1 | 10/1998 |
| EP | 0880924 A1 | 12/1998 |
| EP | 1741849 A1 | 1/2007 |
| EP | 2019211 A1 | 1/2009 |
| EP | 2107656 A1 | 10/2009 |
| FR | 2145921 A5 | 2/1973 |
| FR | 2546604 A1 | 11/1984 |
| FR | 2942008 A1 | 8/2010 |
| GB | 1120656 A | 7/1968 |
| KR | 100780073 B1 | 11/2007 |
| WO | 2009059673 A1 | 5/2009 |

STRUT HANGER

CROSS-REFERENCE TO RELATED APPLICATIONS

This application is a divisional application of U.S. patent application Ser. No. 14/335,497, filed on Jul. 18, 2014, entitled "STRUT HANGER", which is incorporated herein by reference in its entirety.

TECHNICAL FIELD

This patent application generally relates to data center configurations, and more specifically, to strut hangers and strut hanger systems.

BACKGROUND

Data centers use many distribution and power cables, which are supported overhead by threaded rods hanging from the ceiling. A strut extends between the threaded support rods and is traditionally attached to the threaded rods with nuts, which are threaded onto the rods to hold the struts in place. Installation time associated with the traditional technique of threading fasteners on to the threaded rods takes a great deal of time and manpower. Furthermore, any changes in distribution and power cable design, which may require running additional cables or moving cables, requires unthreading the nuts. Moreover, where multiple struts are hung from a single pair of threaded rods, any adjustment to the position of one or more of the struts requires changing the position of the fasteners. Accordingly, there is a need for more efficient ways of attaching a strut to the support rods.

BRIEF DESCRIPTION OF THE DRAWINGS

The strut hanger systems introduced here may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

Technology is disclosed for strut hangers, strut units, and strut hanger systems that can, as an example, facilitate efficient installation and reconfiguration of data center distribution and power cables ("the technology"). A strut hanger is disclosed for quickly attaching strut framing to support or hanging rods, such as threaded rods, used to support distribution and power cables in data centers. In some embodiments, the strut hanger is a sheet metal device that includes a hook portion and a lever portion with a fulcrum disposed therebetween. The hook portion is configured to engage the threads of a rod while the fulcrum is positioned against the rod. A strut engagement tab extends from the lever portion such that, as load is placed on the strut tab, the lever portion acts against the fulcrum to force the hook portion into the threads, thereby locking the strut hanger in position against the threaded rod. The strut hanger can also include a clip extending from the lever portion to engage the threaded rod and maintain a minimum hook engagement tension. The clip can further include a fastener to clamp the threaded rod between the clip and lever portion. In some embodiments, the strut hangers are integrated with a strut to form a single component that engages two threaded rods.

In some embodiments, the strut hanger includes a hook portion configured to engage the threads of a threaded rod, a lever portion, a fulcrum disposed between the hook portion and lever portion, and a strut tab extending from the lever portion and configured to engage a strut. Load placed on the strut tab causes the lever portion to act against the fulcrum to force the hook portion against the threads, thereby supporting the strut from the threaded rods without using fasteners, such as nuts. In some embodiments, the strut hanger can include a clip extending from the lever portion to engage the threaded rod and maintain a minimum load on the lever.

In various embodiments, a strut unit includes a strut portion or elongate support with a pair of hangers integrally disposed on opposite ends. Each hanger includes a hook portion configured to engage a corresponding rod, a lever portion, and a fulcrum disposed between the hook portion and the lever portion. The elongate support extends between the lever portions, whereby a load placed on the elongate support causes the lever portions to act against the fulcrums to force the hook portions against the corresponding rods.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
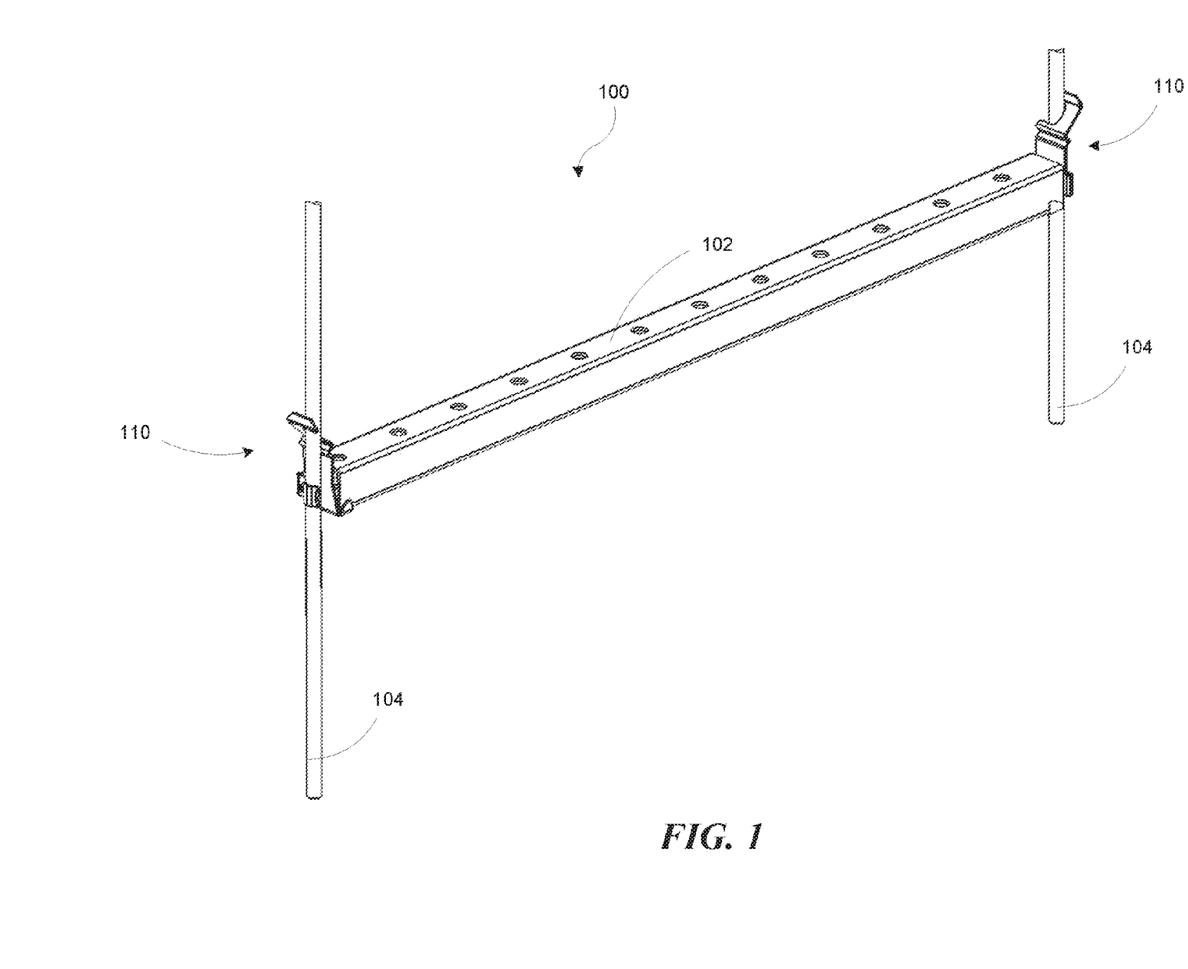
FIG. 1 is a perspective view of a strut hanger system according to a representative embodiment.

FIG. 1 illustrates a strut hanger system 100 according to a representative embodiment. Strut hanger system 100 includes a strut 102 and a pair of strut hangers 110, which connect strut 102 to hanging rods 104. In some embodiments, hanging rods 104 can be threaded rods as traditionally used in data center cabling support systems. Similarly, strut 102 can be traditional strut channel such as strut channel available from Unistrut® Corporation. Although the embodiments described herein for illustrative purposes refer to threaded rod, other hanger or hanging rods having a plurality of spaced apart recesses or protrusions, or other hangers or stanchions can be used with the disclosed technology. Similarly, although strut 102 is described as strut channel having a plurality of apertures, other support strut configurations may be used.

Figure 2:
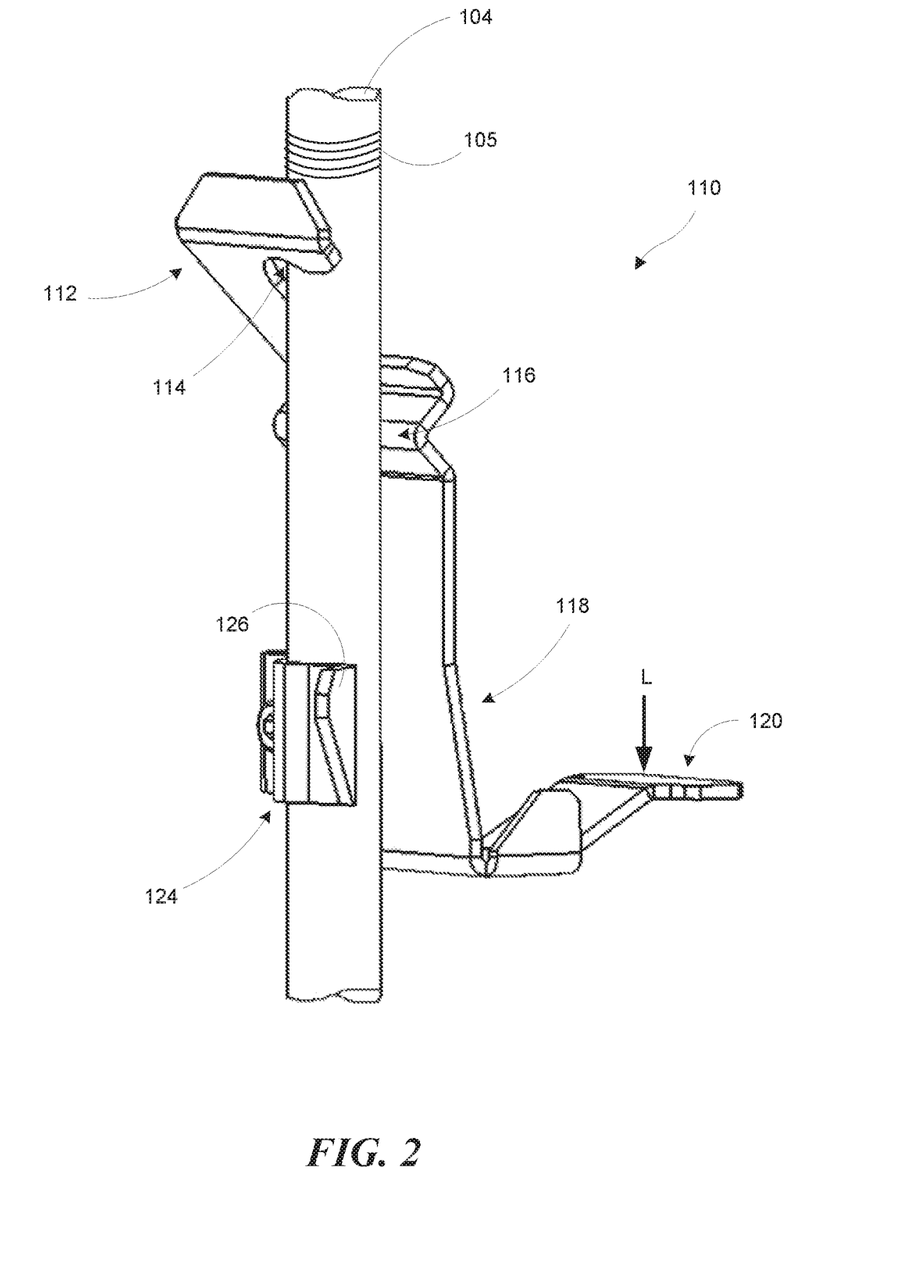
FIG. 2 is a perspective view of a strut hanger as shown in FIG. 1 as viewed from the front right side.

With reference to FIG. 2, strut hanger 110 includes a hook portion 112, which is configured to engage threaded hanger rod 104. Strut hanger 110 also includes a lever portion 118 spaced apart from the hanger rod 104 and a fulcrum 116 disposed between the hook portion and the lever portion, such that the fulcrum engages and can press against the exterior surface of the hanger rod. A support tab 120 extends from lever portion 118, whereby a load L placed on the support tab 120 causes lever portion 118 to act against fulcrum 116 to force the hook portion 112 against the outer surface of the hanging rod 104. Hook portion 112 includes a slot 114 that is configured to engage one or more threads of the threaded rod 104. Accordingly, as hook portion 112 is forced against the hanging rod, the hook portion engages the exterior surface of the rod, such as the threads 105. In other embodiments, strut hanger 110 can be used with a hanger rod 110 having one or more spaced apart recesses, projections, or protrusions and application of the load L on the support tab causes the hook portion 112 securely engage the recesses or protrusions to help secure the strut hanger 110 in a selected fixed position along the hanger rod. Thus, the more force provided through load L against the fulcrum 116, the more hook portion 112 "bites" against or engages threaded hanger rod 104 and resists unwanted axial movement along the hanger rod. In some embodiments, the strut hanger 110 can also include a clip 124 extending from the lever portion 118 to engage the hanger rod 104 while the lever portion 118 is spaced apart from the hanger rod 104 and to maintain a minimum load on the lever portion 118. In some embodiments, clip 124 can include a lead-in tab 126 to facilitate installing the clip onto the threaded rod 104.

Figure 3:
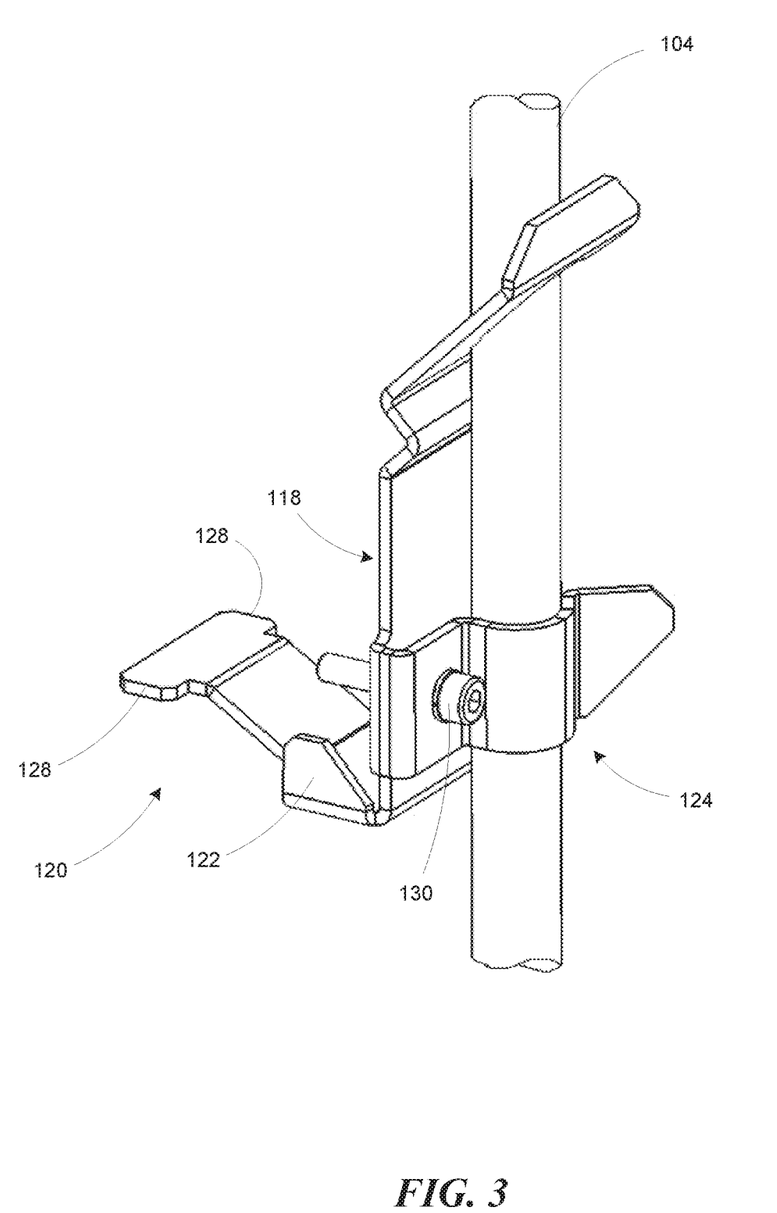
FIG. 3 is a perspective view of the strut hanger shown in FIG. 1 as viewed from the front left side.
Figure 4:
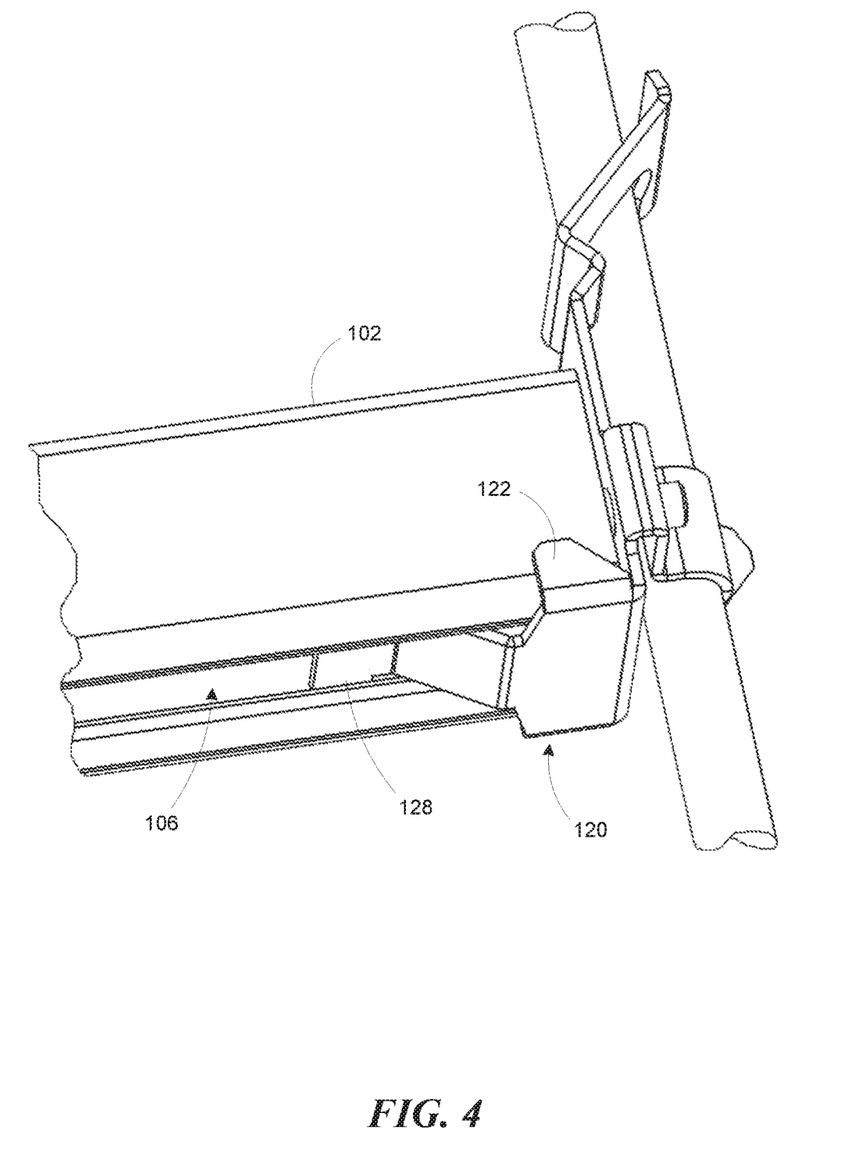
FIG. 4 is a perspective view illustrating the strut hanger support tab as viewed from below.

Referring now to FIG. 3, clip 124 can include a fastener 130 extending between the clip and the lever portion 118 in order to clamp the rod 104 between the clip and lever portion, while still allowing the lever portion 118 to press slightly toward the hanger rod so as to cause the levering action about the fulcrum 116 for secured engagement of hook portion 112 and the surface of the hanger rod. Thus, fastener 130 can provide a selected minimum load on lever 118. Support tab 120 includes a pair of support ears 122 positioned to engage and hold the sides of a strut. A pair of engagement tabs 128 extend from support tab 120 to facilitate engaging a strut channel. With further reference to FIG. 4, the ears 122 of support tab 120 confront the sides of strut 102. Engagement tabs 128 are inserted into the inside 106 of strut 102 thereby capturing the strut 102 between engagement tabs 128 and the support tab 120. In this embodiment, the strut support tab 120 engages the bottom side of strut 102 and engages the channel opening 106 from underneath.

Figure 5:
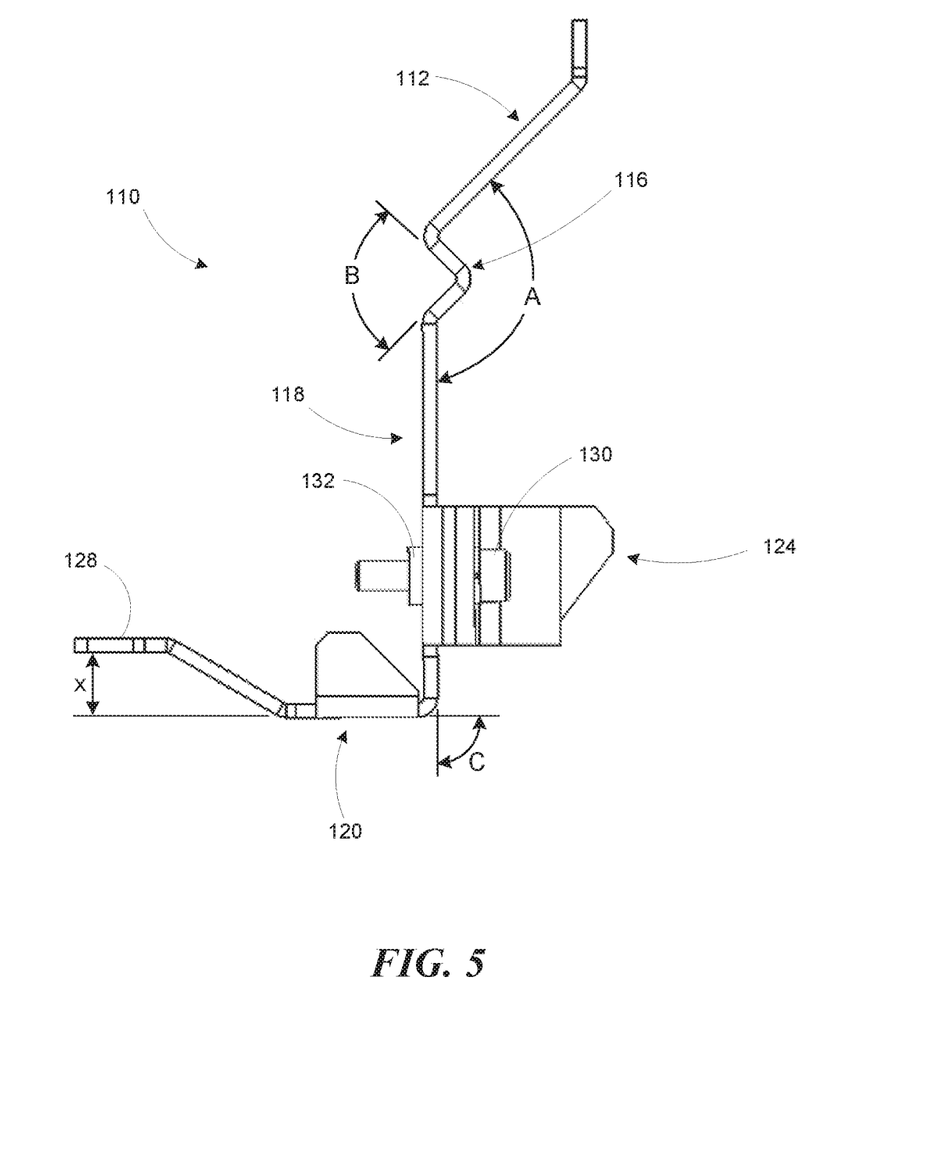
FIG. 5 is a side view in elevation of the strut hanger shown in FIGS. 1-4.

In the embodiment illustrated in the figures, the strut hanger 110 is formed from a sheet metal material. For example, the hook portion 112, lever portion 118, fulcrum 116, and clip 124 as well as the support tab 120 are all integrally formed from a sheet metal material, such as steel, aluminum, or the like. The strut hanger 110 in other embodiments can be made of other suitable materials, such as strong, durable stiff plastic(s) or the like. FIG. 5 illustrates relative angles of the hook portion 112, fulcrum 116, lever portion 118, and support tab 120. The hook portion 112 and lever portion 118 are oriented with respect to each other at an angle A. In one representative embodiment, angle A can be an obtuse angle, such as approximately 135°. In this embodiment, fulcrum 116 comprises a bend B formed in the sheet metal material. For example, angle B can be approximately 90°. Support tab 120 is angled with respect to lever portion 118 by angle C. In this embodiment, angle C is approximately 90°. Engagement tabs 128 are offset a distance X from support tab 120. Distance X can be selected in order to accommodate the strut channel configuration. For example, distance X can be approximately 0.25 inches. Although the embodiments described herein are described with particular angles and dimensions, other suitable angles and dimensions may be used.

As shown in FIG. 5, clip 124 is clamped using fastener 130 as explained above. Fastener 130 can mate with a suitable nut 132, such as a nut, captive fastener, or self-clinching nut, for example. In this embodiment, fastener 132 is a self-clinching nut, which presses into the sheet metal. PEM® nuts available from Penn Engineering of Danboro, Pa. are suitable self-clinching nuts. In some embodiments, fastener 130 can mate with threads formed in lever portion 118.

Figure 6:
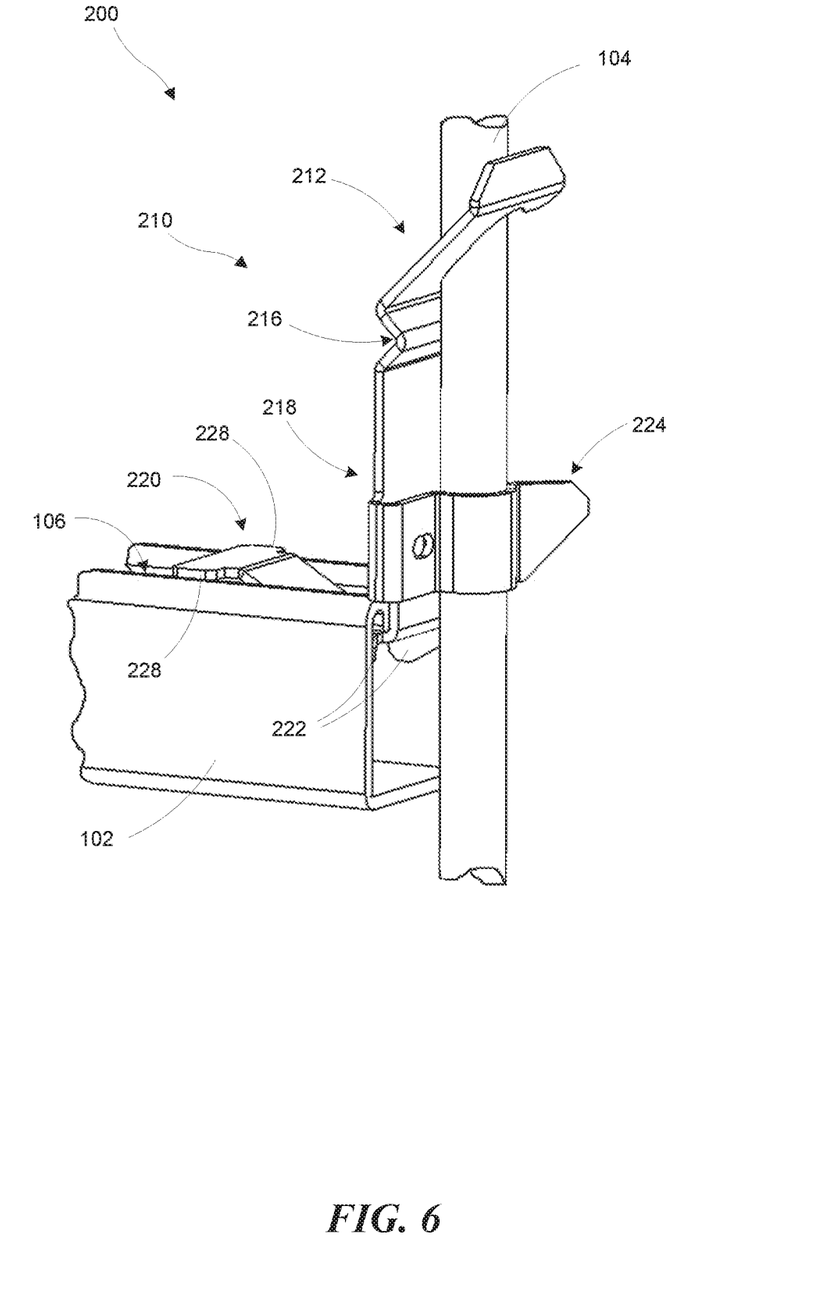
FIG. 6 is a perspective view as viewed from the front left of a strut hanger system according to another representative embodiment.

FIG. 6 illustrates a strut hanger system 200, according to another representative embodiment. Strut hanger 210 has a similar construction as that explained above with respect to FIGS. 1-5. Accordingly, strut hanger 210 includes a hook portion 212, a lever portion 218, and a fulcrum 216 disposed between the hook portion and lever portion. Also, strut hanger 210 can include a clip 224. However, in this illustrated embodiment, the support tab 220 is configured to support the strut channel 102 from the inside rather than the outside, as shown in FIG. 4. Accordingly, the strut channel 102 is upside-down in orientation as compared to the embodiment described above with respect to FIGS. 1-5. In this embodiment, the ears 222 are bent downward and therefore engage the inside of channel opening 106. Engagement tabs 228 confront the outer edges of strut channel 102 and the support tab 220 and ears 222 are inserted into the inside 106 of strut 102 thereby capturing the strut 102 between engagement tabs 228 and the support tab 220.

Figure 7:
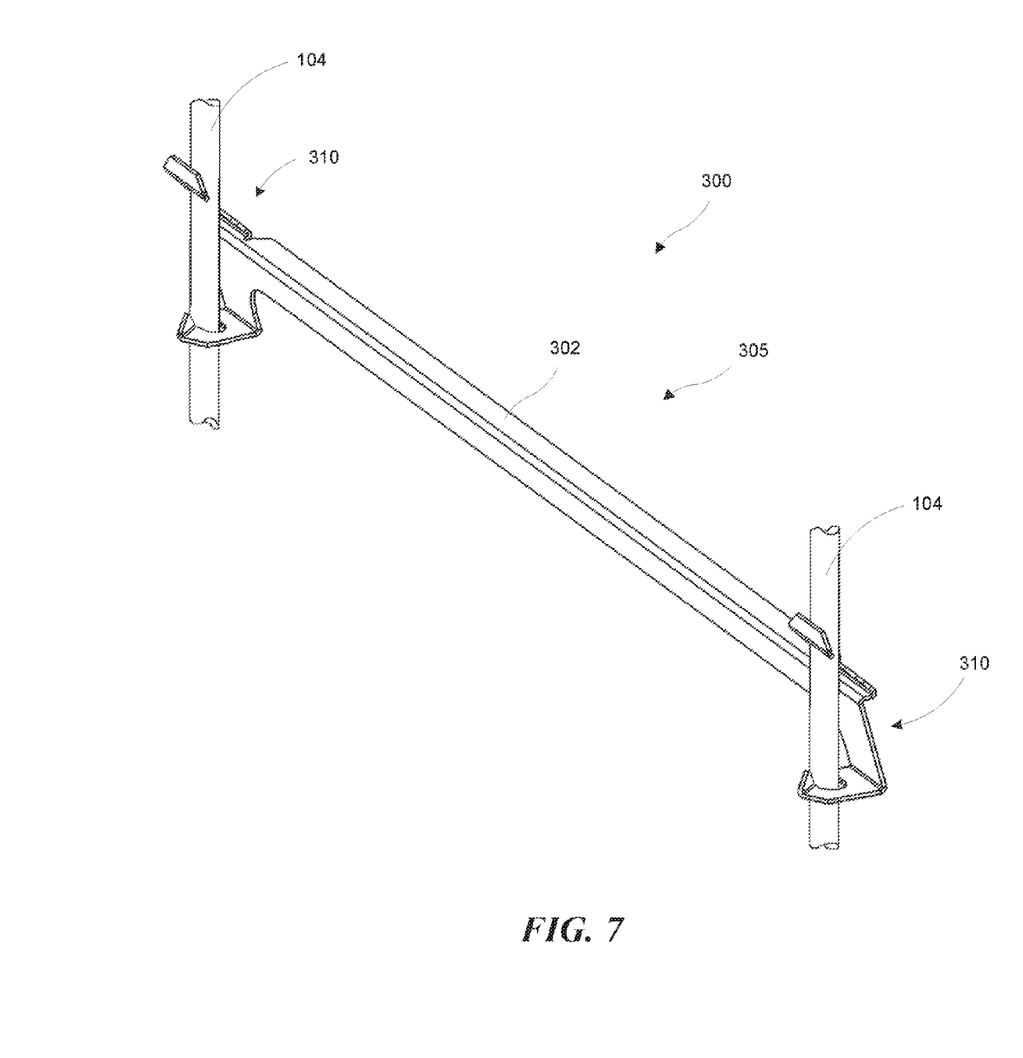
FIG. 7 is a perspective view of a strut hanger system including a strut unit incorporating integral strut hangers according to a representative embodiment.
Figure 8:
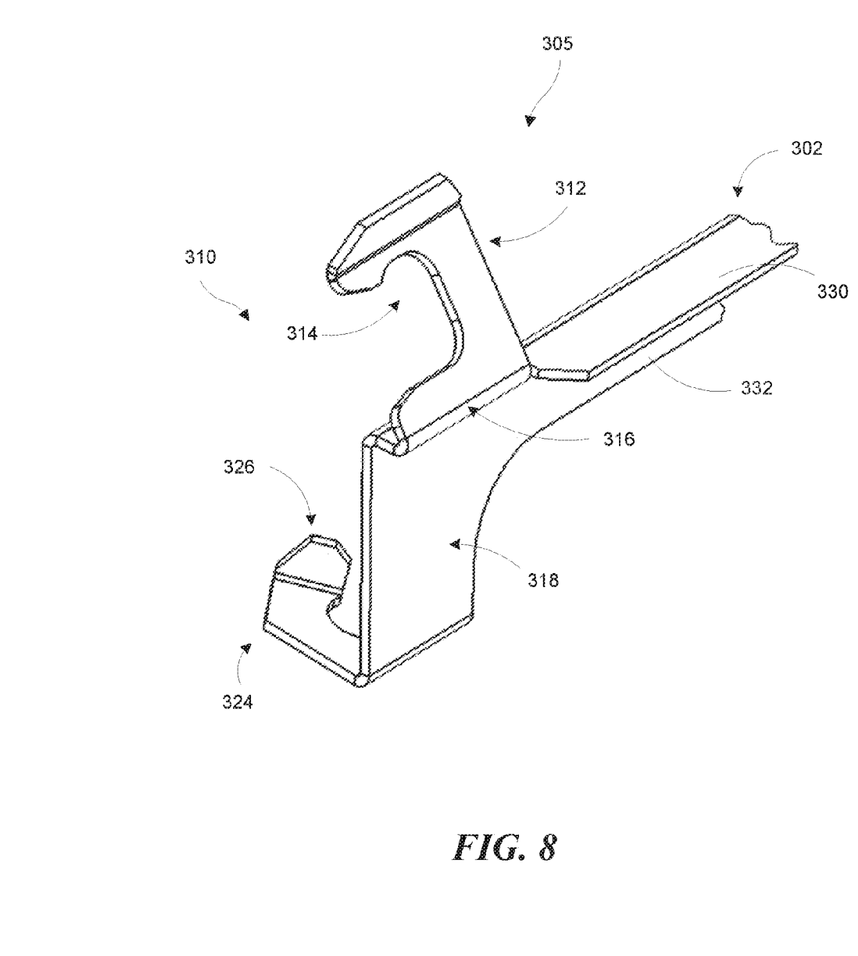
FIG. 8 is a partial perspective view of the strut unit shown in FIG. 7 as viewed from the back.
Figure 9:
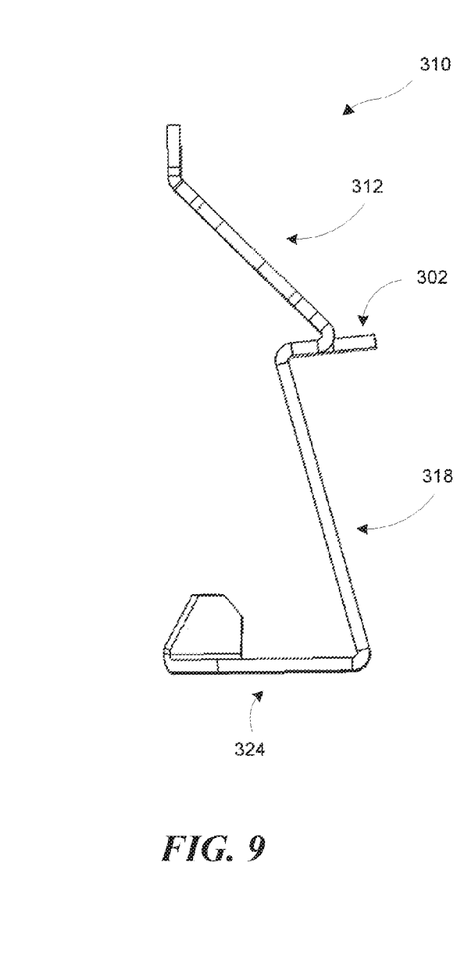
FIG. 9 is a side view in elevation of the strut hanger shown in FIGS. 7 and 8.

FIG. 7 illustrates a strut hanger system 300 according to another representative embodiment. Strut hanger system 300 includes a strut unit 305, including an elongate support 302 and a pair of hangers 310 disposed on opposite ends of the elongate support 302. Each hanger 310 is configured to attach to a hanger rod, such as a threaded hanger rod 104. As shown in FIG. 8, strut hanger 310 includes a hook portion 312 with a slot opening 314 configured to engage a hanger rod. Strut hanger 310 also includes a lever portion 318 spaced apart from the hanger rod and connected to a fulcrum 316 disposed between the hook portion 312 and lever portion 318. Strut hanger 310 also includes a clip 324 along with a lead-in tab 326. Slot opening 314 engages a corresponding hanger rod and the lever portion 318 is flexed until clip 324 engages the hanger rod to maintain a minimum load on the lever portion 318. Accordingly, slot opening 314 is radially offset from clip 324. As lever portion 318 is flexed, it acts against fulcrum 316 to force the hook portion 312 against the outer surface of the hanging rod 104. Elongate support 302 extends from fulcrum 316 along surface 330 and also extends from lever portion 318 along surface 332. With further reference to FIG. 9, a load placed on elongate support 302 also forces the hook portion 312 against the outer surface of the hanger rod. Strut unit 305 of the illustrated embodiment can be comprised of a suitable material, such as sheet metal material, so that hook portion 312, elongate support 302, lever portion 318, and clip 324 are all integrally connected and comprised of bent angles in the sheet metal.

Figure 10:
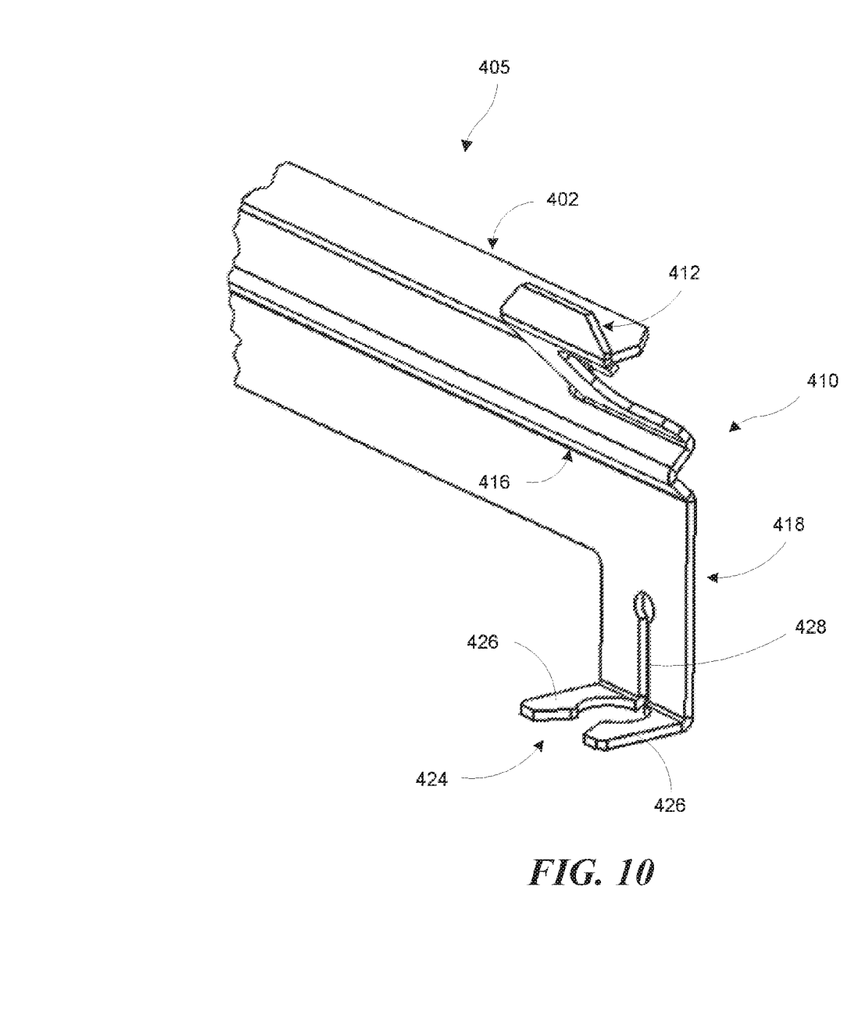
FIG. 10 is a partial perspective view of a strut unit according to another representative embodiment.
Figure 11:
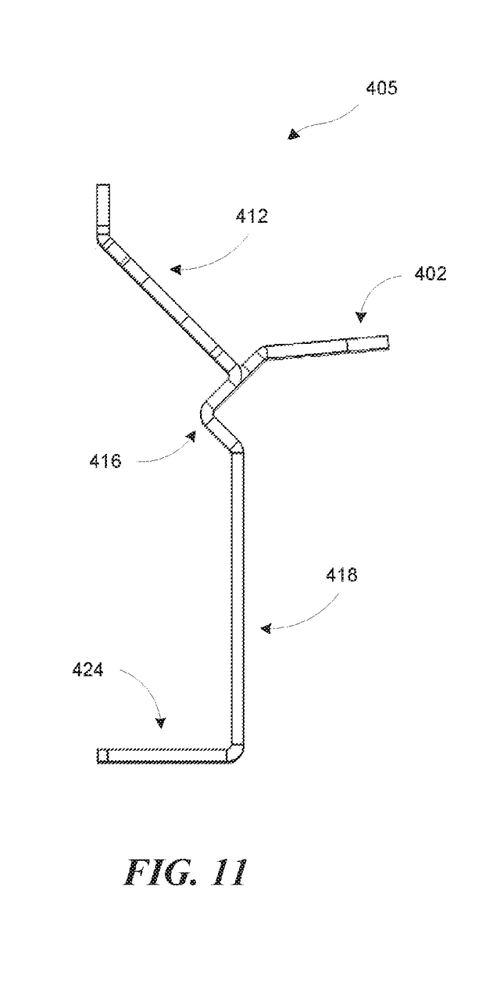
FIG. 11 is a side view in elevation of the strut hanger shown in FIG. 10.

FIGS. 10 and 11 illustrate a strut unit 405 according to another representative embodiment. Strut unit 405 includes an elongate support 402 with a pair of hangers 410 disposed on opposite ends of the elongate support. Each hanger 410 includes a hook portion 412, a lever portion 418, and a fulcrum 416 disposed therebetween. Strut hanger 410 also includes a clip 424 configured to engage the hanger rod to provide a minimum load against fulcrum 416 and hook portion 412. Hook portion 412 engages a corresponding hanger rod and the lever portion 418 is flexed until clip 424 engages the hanger rod. As lever portion 418 is flexed, it acts against fulcrum 416 to force the hook portion 412 against the outer surface of the hanging rod 104. In this embodiment, clip 424 includes a pair of fingers 426 extending from lever portion 418. Lever portion 418 may include a relief 428 extending from between fingers 426 upwards along its length in order to provide a resiliency or spring force to snap the clip 424 onto a threaded rod. With further reference to FIG. 11, a load placed on elongate support 402 also forces the hook portion 412 against the outer surface of the hanger rod.

Figure 12:
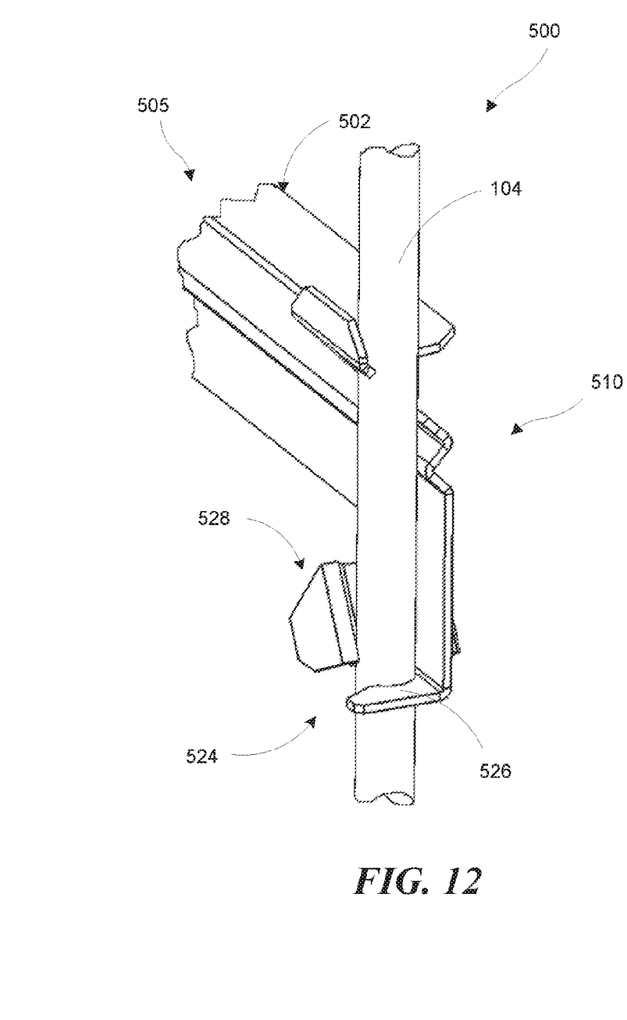
FIG. 12 is a perspective view of a strut hanger system according to a further representative embodiment.
Figure 13:
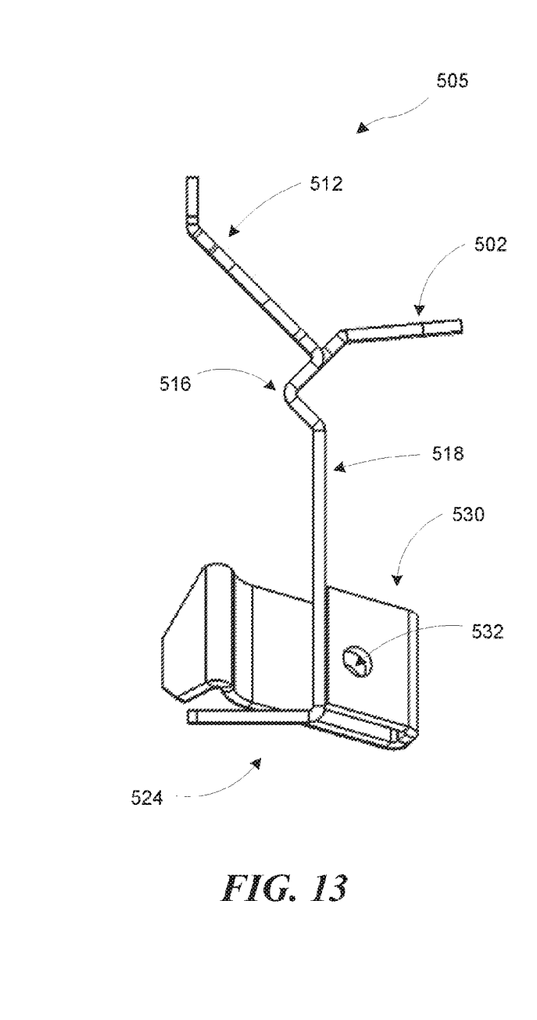
FIG. 13 is a side view in elevation of the strut unit shown in FIG. 12.

FIGS. 12 and 13 illustrate a strut hanger system 500 according to a further representative embodiment. Strut hanger system 500 includes a strut unit 505, which attaches to a pair of threaded rods 104. Strut unit 505 includes an elongate support 502 with a pair of strut hangers 510 disposed on opposite ends. Strut hanger 510 includes a hook portion 512, lever portion 518, and a fulcrum 516 disposed therebetween. In this embodiment, clip 524 includes a finger 526 and an opposing clip 528 whereby threaded rod 104 is captured between finger 526 and clip 528. Hook portion 512 engages a corresponding hanger rod and the lever portion 518 is flexed until clip 524 engages the hanger rod. As lever portion 518 is flexed, it acts against fulcrum 516 to force the hook portion 512 against the outer surface of the hanging rod 104. As shown in FIG. 13, clip 528 includes a return flange 530 to provide a spring force against the threaded rod. As the clip 524 is pressed against the hanger rod 104, the return flange 530 flexes out of the way until the clip 524 snaps onto the hanger rod. Return flange 530 can include an aperture 532 for receiving a fastener, such that the fastener may be tightened in order to clamp the threaded rod between finger 526 and clip 528. Thus, the fastener can prevent the return flange from flexing and releasing the captured hanger rod. With further reference to FIG. 13, a load placed on elongate support 502 also forces the hook portion 512 against the outer surface of the hanger rod.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A strut unit, comprising:
   an elongate support; and
   a pair of hangers located on opposite end portions of the elongate support, each hanger including:
   a hook portion configured to engage a corresponding rod;
   a lever portion; and
   a fulcrum disposed between the hook portion and the lever portion such that the fulcrum contacts the corresponding rod when the hook portion engages the corresponding rod;

wherein the elongate support connects to and extends between the fulcrums, whereby a load placed on the elongate support forces the hook portions against the corresponding rods.

2. The strut unit according to claim 1, wherein the elongate support, the hook portions, the lever portions, and the fulcrums are integrally formed of a sheet metal material.

3. The strut unit according to claim 2, wherein the fulcrums comprise a bend in the sheet metal material.

4. The strut unit according to claim 3, wherein the elongate support connects to and extends between the lever portions.

5. The strut unit according to claim 1, wherein the hook portions are configured to engage one or more recesses or projections on the corresponding rods.

6. The strut unit according to claim 1, wherein the pair of hangers each further comprise a clip extending from the lever portion to engage the corresponding rod and maintain a minimum load on the lever portion.

7. The strut unit according to claim 6, wherein the pair of hangers each further comprise a fastener extending between the clip and the lever portion and operative to clamp the corresponding rod between the clip and the lever portion.

8. A strut unit, comprising:
an elongate support; and
a pair of hangers disposed on opposite end portions of the elongate support, each hanger including:
  a hook portion configured to engage a corresponding rod;
  a lever portion; and
  a fulcrum disposed between the hook portion and the lever portion such that the fulcrum contacts the corresponding rod when the hook portion engages the corresponding rod;
wherein the elongate support, the hook portions, the lever portions, and the fulcrums are integrally formed of a sheet metal material.

9. The strut unit according to claim 8, wherein the elongate support extends between the lever portions, whereby a load placed on the elongate support causes the lever portions to act against the fulcrums to force the hook portions against the corresponding rods.

10. The strut unit according to claim 8, wherein the elongate support connects to and extends between the fulcrums, whereby a load placed on the elongate support forces the hook portions against the corresponding rods.

11. The strut unit according to claim 8, wherein the hook portions are configured to engage one or more recesses or projections on the corresponding rods.

12. The strut unit according to claim 8, wherein the fulcrums comprise a bend in the sheet metal material.

13. The strut unit according to claim 12, wherein the elongate support connects to and extends between the fulcrums.

14. A strut hanger system, comprising
a pair of hanger rods; and
a strut unit, including:
  an elongate support; and
  a pair of hangers disposed on opposite end portions of the elongate support, each hanger including:
    a hook portion configured to engage a corresponding one of the pair of hanger rods;
    a lever portion; and
    a fulcrum disposed between the hook portion and the lever portion such that the fulcrum contacts the corresponding hanger rod when the hook portion engages the corresponding hanger rod;
  wherein the elongate support, the hook portions, the lever portions, and the fulcrums are integrally formed of a sheet metal material.

15. The strut unit according to claim 14, wherein the fulcrums comprise a bend in the sheet metal material.

16. The strut hanger system according to claim 15, wherein the elongate support extends between the lever portions, whereby a load placed on the elongate support causes the lever portions to act against the fulcrums to force the hook portions against the corresponding hanger rods.

17. The strut hanger system according to claim 15, wherein the elongate support connects to and extends between the fulcrums, whereby a load placed on the elongate support forces the hook portions against the corresponding hanger rods.

18. The strut hanger system according to claim 14, wherein the hanger rods comprise threaded rod.

19. The strut unit according to claim 18, wherein the hook portions are configured to engage one or more threads on the corresponding hanger rods.

20. The strut hanger system according to claim 14, wherein the elongate support connects to and extends between the lever portions and the fulcrums, whereby a load placed on the elongate support forces the hook portions against the corresponding hanger rods.

* * * * *